United States Patent Office 2,947,648
Patented Aug. 2, 1960

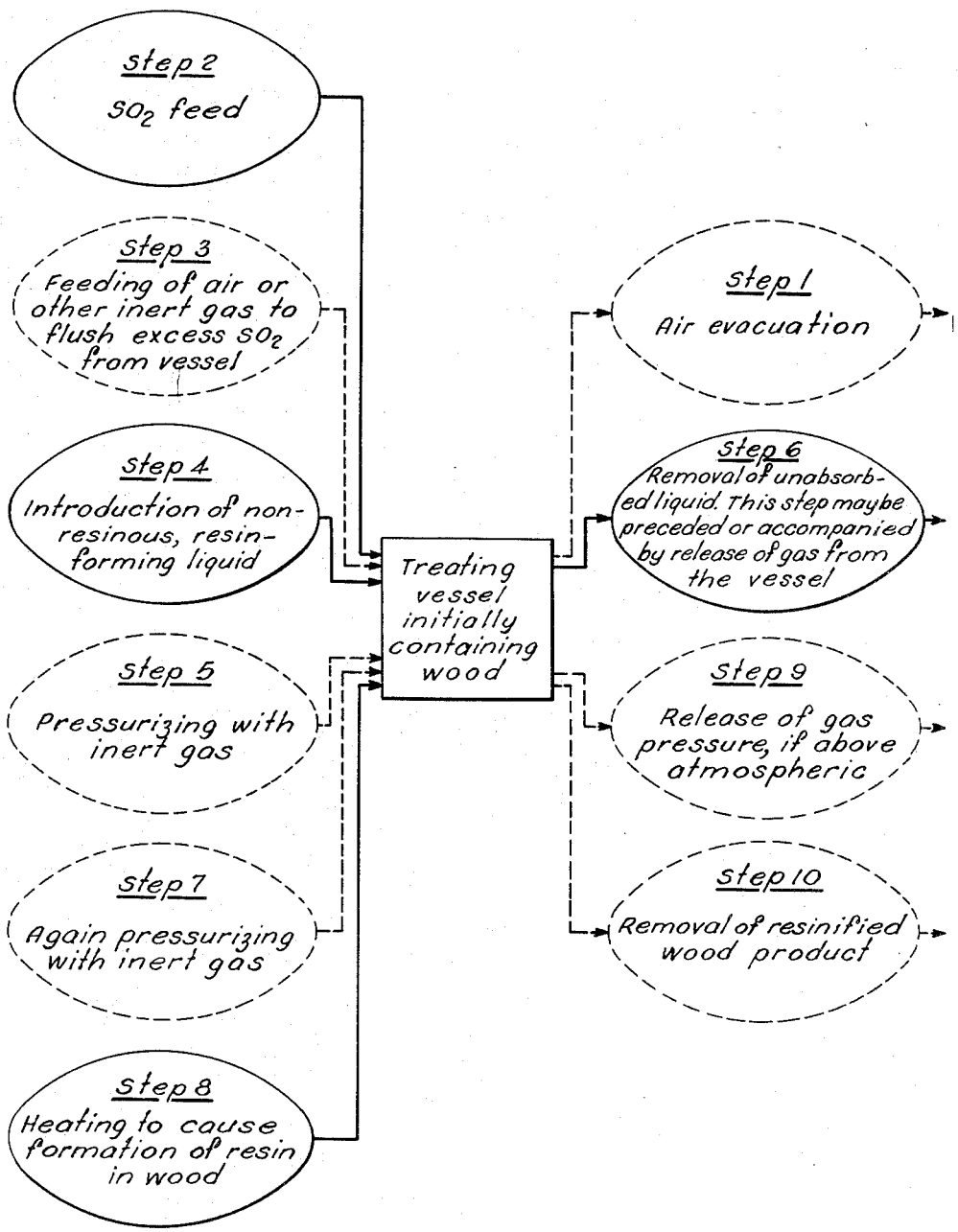

2,947,648

RESINIFICATION OF WOOD

Lawrence F. Sonnabend and Charles R. Williams, Midland, Mich., assignors to The Dow Chemical Company, Midland, Mich., a corporation of Delaware Filed Dec. 21, 1955, Ser. No. 554,404

14 Claims. (Cl. 117—59)

This invention concerns an improved method of treating wood to form solid, resinous materials within pores, or cells, of the same.

It has long been known that wood can be hardened, or otherwise improved in properties, by being impregnated with resinous materials, but the known methods for accomplishing this purpose have been satisfactorily effective only in impregnating thin sheets or panels of wood, e.g. of ½ inch thickness or less. Boards, beams, or logs can be impregnated to greater depths by known methods, but the impregnation to depths greater than ¼ inch usually occurs in a non-uniform manner and is not satisfactory. A general method heretofore proposed involves soaking the wood in a preformed liquid phenol-formaldehyde resin and thereafter heating to form an advanced-stage solid resin within the wood. Various modified procedures, such as those of steaming and evacuating the wood prior to impregnating it with the liquid resin, or of applying pressure during the impregnation, or during solidification of the resin by heating, have been proposed, but have not resulted in satisfactorily uniform impregnation of wood in a direction transverse to the grain to depths greater than about ¼ inch. Such use of a preformed liquid phenol-formaldehyde resin as the impregnant is not only of limited effectiveness, but is disadvantageous in that the liquid resin tends to increase in viscosity on standing and cannot satisfactorily be stored in large quantities for use in the process.

A copending application, Serial No. 406,074, filed January 25, 1954, now Patent No. 2,740,728, of which the present application is a continuation in part, discloses a method of resinifying solid porous bodies which involves impregnating such a body, e.g. wood, first with a normally gaseous basic nitrogen compound such as ammonia and thereafter with a non-resinous, resin-forming liquid, preferably a liquid mixture of phenol and formaldehyde, and then heating to convert the liquid impregnant to a solid resin within the wood or other impregnated solid body. The ammonia or other gaseous basic nitrogen compound readily penetrates wood to considerable depths. Its presence in the wood facilitates subsequent impregnation of the wood with the non-resinous, resin-forming liquid. It also serves as a catalyst, or condensing agent, for conversion of the liquid impregnant to a solid resin within the wood. The non-resinous, resin-forming liquids, such as liquid mixtures of phenol and formaldehyde or of urea and formaldehyde are, in the absence of catalysts or condensing agents, more stable at room temperature than are the corresponding liquid resins preparable therefrom. They can be prepared in large quantities and be stored for several months without reacting or changing in viscosity to an objectionable extent. Also, they are less viscous than the corresponding liquid resins preparable therefrom and in most instances impregnate wood more deeply and uniformly than do the liquid resins when similarly applied. The method of said copending application is convenient and economical to practice and permits substantially uniform resinification of wood to considerable depths from the surfaces thereof. Lumber resinified by the method of the copending application is more resistant to attack by strong mineral acids than is untreated lumber of the same kind.

It has now been found that sulfur dioxide can be used satisfactorily in place of, and in some instances more advantageously than, ammonia or other normally gaseous basic nitrogen compounds in a process otherwise similar to that of the above-mentioned copending application, Serial No. 406,074, now Patent No. 2,740,728. Sulfur dioxide rapidly penetrates wood to a considerable depth and tends to remain absorbed in the wood. It can be applied as a liquid or gas to rapidly impregnate lumber or logs throughout with the same. Although it tends to remain absorbed in the wood, it does not have appreciable detrimental effect on the strength or hardness of the wood such as is exhibited by stronger acids, e.g. by aqueous solutions of sulfuric acid or of hydrochloric acid. The absorbed sulfur dioxide facilitates subsequent impregnation of the wood by a non-resinous, resin-forming liquid, presumably due to it becoming dissolved in the liquid and thus tending to suck the resin-forming liquid into the wood. It also serves as a catalyst, or condensing agent, for conversion of non-resinous, resin-forming liquids, such as those hereinbefore mentioned, to solid resins within the wood.

Any non-resinous liquid capable of undergoing a condensation reaction to form a solid resin can be employed as an impregnating agent for wood in the process of the invention. Examples of suitable resin-forming liquids are furfuryl alcohol and mixtures of furfuryl alcohol with a lesser amount, e.g. 0.8 or less of its weight, of one or more co-condensible compounds such as furfural, formaldehyde, maleic anhydride, phenol, or acetone, which liquids, rich in furfuryl alcohol, can be reacted to form solid furan resins; solutions of phenol and formaldehyde; of cresol and formaldehyde; of chlorophenol and formaldehyde; of urea and formaldehyde; of furfural and phenol; and solutions of furfural, formaldehyde and phenol; etc. Such non-resinous, resin-forming liquids possess good stability at room temperature in the absence of catalysts. They can be stored in large quantities and be withdrawn as required for use in the process. Although sulfur dioxide is effective as a catalyst, or agent, for the conversion of any of the above-mentioned resin-forming liquids to solid resinous condensation products, it is of particular advantage as an agent for the formation and hardening of furan resins, e.g. it is more effective than ammonia for this purpose. The furan resins, when formed in a body of wood, render the latter resistant to chemical attack by acids or alkalies, whereas most of the other resins when similarly formed in bodies of wood render the wood resistant to attack by acids, but leave it susceptible to attack by alkalies. Accordingly, the above-mentioned liquids rich in furfuryl alcohol and reactive to form furan resins are preferably employed as the non-resinous, resin-forming liquid impregnants.

It is desirable that the resin-forming impregnant be a fairly thin liquid, e.g. having a viscosity of 100 centipoises or less at 25° C. Inert liquid diluents such as of water, methanol or ethanol, etc., can, if desired, be used to thin the impregnating liquids in instances in which they are soluble therein. The resin-forming liquid is preferably free of condensation products thereof, although the presence of a small proportion, e.g. 10 weight percent or less, of such condensation products in liquid polymer form can be tolerated. The resin-forming liquid should not be converted largely to a liquid resin before being applied to the wood, since the liquid resins do not penetrate into wood as readily or as deeply as desired. Also, the liquid resins tend to thicken more rapidly and extensively on standing than do the corresponding non-resinous, resin-forming liquids.

The method of the invention can be applied satisfactorily to impregnate wood, regardless of whether the latter be green, air-dried, or kiln-dried and regardless of whether it has been given a conventional pre-treatment such as steaming to open the pores of the same. It is usually applied in treating lumber and timbers in the condition in which they are received from the mill.

The accompanying drawing is a flow sheet indicating, in schematic manner, steps for practice of the invention as hereinafter described. Certain of the steps are essential. Others are usually desirable, but are not required. Legends identifying the essential steps are enclosed by solid lines and are provided with solid lead lines. Broken lines are similarly used with respect to the legends identifying non-essential steps. The steps are numbered to indicate the relative order in which they are carried out. Thus, when employing all of the steps, they are carried out in the numerical order indicated. When any of the non-essential steps are omitted, the remaining steps are carried out in otherwise similar order.

The wood is placed in a vessel and the latter is closed. The vessel is preferably evacuated, e.g. by pumping air therefrom, until the gas pressure inside of the vessel has been reduced to 0.5 atmosphere, absolute, or less. This operation has an effect of rendering the wood more receptive to impregnation with sulful dioxide and the resin-forming liquid than when it is omitted. It is usually accomplished without heating the vessel or the wood therein, but heat can be applied to facilitate removal of moisture from the wood.

The initial evacuation step is usually employed, but is not essential and can be omitted.

Sulfur dioxide is introduced into the vessel containing the wood. The sulful dioxide is preferably introduced to the air-evacuated vessel containing the wood in amount sufficient to develop a pressure of about 1 atmosphere in the vessel, but it can be applied to develop a pressure as great as desired. Alternatively, the vapor pressure inside the vessel may be at, or above, atmospheric pressure when the sulfur dioxide is fed in and the sulfur dioxide can be used to flush air from the chamber. The sulfur dioxide is preferably employed in gaseous form, but it can be fed as a liquid into the vessel and be vaporized in contact with the wood. The wood is retained in contact with the sulfur dioxide until impregnated therewith. Under the preferred conditions just stated, boards or planks of 4 inches thickness or less can usually be impregnated throughout with the gaseous sulfur dioxide in from 20 minutes to one hour.

Sulfur dioxide not absorbed by the wood is preferably removed from the vessel, e.g. by drainage or by flushing gaseous sulfur dioxide from the vessel with air, nitrogen, carbon dioxide, or other substantially inert gas. A non-resinous, resin-forming liquid is fed into the vessel and the wood, or the portion of the wood to be impregnated, is immersed therein. Although any of the non-resinous, resin-forming liquids hereinbefore mentioned may be used, those rich in furfuryl alcohol and chemically reactive to form furan resins are preferred. When a phenol-formaldehyde resin is to be formed within the wood, a solution of one molecular equivalent of a monohydric phenol, e.g. phenol itself, and from 1 to 2 moles of formaldehyde, which solution may be formed by admixing the phenol, with an aqueous formaldehyde solution of at least 20 weight percent concentration, can advantageously be used as the resin-forming liquid impregnant.

A substantially inert gas or vapor, such as air or nitrogen, is preferably fed into the vessel to develop a pressure greater than atmospheric, e.g. of from 30 to 100 pounds per square inch gauge or higher, and thus force the liquid into the wood, but pressurizing is not required. As hereinbefore mentioned, the initial treatment of wood with sulfur dioxide facilitates penetration of the resin-forming liquid into the wood, and adequate impregnation of the wood with the resin-forming liquid can often be obtained without applying pressure, especially when the wood is a hardwood such as red oak or maple in the form of pieces of 1 inch thickness or less. The time required for impregnation with the resin-forming liquid is dependent on the pressure applied, the kind and thickness of the wood, and the depth of impregnation desired. Most lumber of from ¾ to 4 inches thickness can be impregnated throughout under an applied pressure of 50–100 pounds per square inch, gauge, in less than one day and sometimes in less than one hour.

Thereafter, resin-forming liquid in excess of that absorbed by the wood is drained from the vessel and usually is neutralized. The vessel is preferably again pressurized, e.g. with air, steam, or nitrogen to 50 pounds per square inch gauge pressure or higher, and the vessel and its contents are heated at temperatures in the order of from 50° to 150° C., or above, preferably from 65° to 85° C., to cause formation and hardening of a resin in the wood. Application of a vapor pressure during this heat curing operation is not required, but reduces or prevents bleeding of a portion of the resin-forming liquid from the wood. The time of heating for formation and hardening of the resin in the wood varies with changes in the kind of resin-forming liquid employed, the temperature to which the wood is heated, and the thickness of the impregnated wood pieces, but is usually in the order of from 16 to 24 hours.

Such formation of a solid resin in the wood is advantageous in several respects. The resinified wood undergoes less shrinkage or swelling with a change in humidity than does untreated wood of the same kind. The treatment usually hardens the wood. Wood resinified by treatment with any of the non-resinous, resin-forming liquids hereinbefore mentioned is more resistant than untreated wood to chemical attack by acids and can be used for the construction of storage tanks for acidic materials. Wood resinified in accordance with the invention with a furan resin usually is also more resistant to chemical attack by alkalies than is untreated wood of the same kind.

The following examples describe ways in which the invention has been practiced and illustrate certain of its advantages, but are not to be construed as limiting its scope.

EXAMPLE 1

This example illustrates the fact that wood pieces of various kinds are more extensively resinified by the method of the invention, employing a non-resinous solution of phenol and formaldehyde as the resin-forming impregnant, than when wood pieces of the same kinds and sizes are resinified in similar manner except that a liquid condensation product of phenol and formaldehyde in the same relative proportions is used as the liquid impregnant reactive to form a solid resin in the wood. The first of the liquid impregnants just mentioned was prepared by mixing one molecular equivalent of phenol with an aqueous 37 weight percent formaldehyde solution containing 1.45 molecular equivalents of formaldehyde. The other liquid impregnant was prepared by adding, to a similar solution of phenol and formaldehyde in the proportions just stated, sodium hydroxide in amount corresponding to 1.5 percent of the weight of the phenol ingredient and warming the mixture for 6 hours at 60° C., whereby a liquid phenol-formaldehyde condensation product, i.e. a so-called "liquid resin," was formed. Both of the liquid impregnants were prepared at about the same time and had stood at room temperature for about 60 days before being used in the experiments of this example. Test pieces of Ponderosa pine wood, red oak, and of hard maple were employed in the experiments. The test pieces of Ponderosa pine and of hard maple each had dimensions of 24 inches x 2 inches x 2 inches. Each red oak test piece had dimensions of 24 inches x 1.5 inches x 1.5 inches. Before being employed in the experiments, each test piece of wood was sealed at the ends, by surface-treatment with a phenol-formaldehyde resin and hardening of the latter, so as to prevent lengthwise impregnation through the grain of the wood. In each experiment, the wood pieces, thus sealed at the ends, were individually weighed and placed in a chamber. Air was pumped from the chamber to reduce the gas pressure in the chamber to about 50 mm. of mercury, absolute, and this reduced pressure was maintained for about 15 minutes. Gaseous sulfur dioxide was then fed to the air-evacuated chamber in amount bringing the gas pressure in the chamber to approximately one atmosphere. The wood in the chamber was maintained in contact with the sulfur dioxide at about one atmosphere pressure for 15 minutes, after which the portion of sulfur dioxide not absorbed by the wood was swept from the vessel with air. One of the above-mentioned liquid impregnants was then introduced in amount covering the wood. The chamber containing the wood immersed in the liquid was then pressurized with air at 70 pounds per square inch, gauge, and this pressure was maintained for one hour. The pressure was then released and unabsorbed liquid was drained from the chamber. Air was again fed to increase the gas pressure in the chamber to about 70 pounds per square inch, gauge. While maintaining this pressure, the chamber and its contents were heated at 75° C. for 20 hours, whereby the liquid impregnant absorbed in the wood was converted to a solid resin. The pressure was then released and the resinified wood was removed from the chamber and each piece thereof was weighed. The percent by which the weight of a resinified piece of wood exceeded the initial weight of the piece of wood is reported in the following table as the "percent pickup" of resin in the wood. The table names each kind of wood employed and indicates which of the above-mentioned liquid impregnants was used in treating the same. In the table, the solution of phenol and formaldehyde is referred to as a "non-resinous liquid" and the liquid phenol-formaldehyde condensation product is termed a "liquid resin."

*Table I*

| Test No. | Wood | Impregnant | Percent Pickup |
|---|---|---|---|
| 1 | Ponderosa Pine | Non-resinous Liquid | 40 |
| 2 | Red Oak | do | 47 |
| 3 | Hard Maple | do | 26 |
| 4 | Ponderosa Pine | Liquid Resin | 16.5 |
| 5 | Red Oak | do | 18.8 |
| 6 | Hard Maple | do | 10.5 |

It will be noted that tests 4–6 in the table represent practice outside the scope of the invention and are presented for purpose of comparison with tests 1–3 which were carried out in accordance with the invention.

EXAMPLE 2

In each of a series of tests, a Ponderosa pine block which had been oven-dried at 100° C. was resinified by the method of the invention. Each of the test blocks had dimensions of 4 inches x ⅝ inch x ⅝ inch. In each, test, several of the wooden blocks were placed in a chamber and air was pumped from the latter to reduce the gas pressure in the chamber to approximately 25 mm. of mercury, absolute. After maintaining this reduced pressure for about 15 minutes, sulfur dioxide was fed into the chamber to bring the gas pressure in the chamber to about one atmosphere. After the wood had been in contact with the sulfur dioxide at atmospheric pressure for about 15 minutes, the sulfur dioxide in excess of that absorbed by the wood was swept from the chamber with air. A non-resinous, resin-forming liquid of the kind indicated in the table was fed into the chamber to cover the wood.

The chamber was then pressurized with air at 68 pounds per square inch gauge pressure for the "impregnation time" given in the table. The portion of the liquid not absorbed by the wood was withdrawn from the chamber, after which the latter was pressurized with air at 68 pounds per square inch gauge. While maintaining this pressure, the chamber and the impregnated wood contained therein were heated at 80° C. for the "curing time" given in the table. The liquid contained in the wood was thereby converted to a solid resin. The pressure was then released and the resinified wooden blocks were removed from the chamber. A resinified wood block from each such run and an untreated, i.e., non-resinified, wood block were immersed in each of the following respective liquids: an aqueous sulfuric acid solution of 10 weight percent concentration; an aqueous 10 weight percent hydrochloric acid solution; and an aqueous 10 weight percent sodium hydroxide solution. These solutions having the test blocks immersed therein were stored in an unheated building in Michigan, U.S.A., for one year. The blocks were then removed from the solutions, washed with water and examined and tested to determine the effect of the above-mentioned solutions thereon. The untreated blocks of wood were swollen, weakened, and rendered soft so that a knife blade easily penetrated transversely into, or through the thickness of, the block under a moderate force applied by the hand. The non-resinified wood blocks were swollen more extensively by the aqueous sodium hydroxide solution than by the aqueous acid solutions. The effect of the respective solutions on the resinified blocks of wood was determined by comparison with the effect of the same solutions on the non-resinified wooden blocks. Those resinified blocks of wood that appeared to be swollen and softened by one of the test solutions to about the same extent as the non-resinified wood were given a rating of "P" meaning that they were in poor condition; those resinified blocks of wood that were considerably swollen or softened by a test solution, but not as extensively as the non-resinified wood, were rated "F," which means that they were in fair condition at the end of the test; and those resinified blocks of wood which were not swollen, softened, or otherwise damaged to a considerable extent by the immersion for one year in a test solution were rated "G," which means that they were in good condition at the end of the test. Table II gives the composition of each of the non-resinous, resin-forming impregnants and the ratings of wooden test blocks resinified therewith after the test blocks had been immersed for one year in the respective acidic or alkaline test solutions which are indicated.

*Table II*

| Run No. | Composition of Resin-forming Liquid Impregnant | Ratings of resinified test blocks after immersion in— | | |
|---|---|---|---|---|
| | | 10% HCl Sol'n. | 10% H₂SO₄ Sol'n. | 10% NaOH Sol'n. |
| 1 | Furfuryl alcohol | G | G | F. |
| 2 | Solution of: 2 moles of furfuryl alcohol; 1 mole of phenol. | G | G | F. |
| 3 | Solution of: 1 mole of furfuryl alcohol; 1 mole of phenol. | F | G | P. |
| 4 | Solution of: 1.5 moles of furfural; 1 mole of phenol. | F | G | P. |
| 5 | Solution of: 1 mole of furfural; 1 mole of phenol. | G | F | P. |
| 6 | Solution of: 2 moles of formaldehyde; 1 mole of urea. | G | not determined. | P. |
| 7 | Solution of: 1.5 moles of formaldehyde; 1 mole of phenol. | G | G | P. |

We claim:
1. A method of resinifying wood which comprises con- tacting the wood with sulfur dioxide to cause permeation of the latter into the wood, impregnating the wood, having sulfur dioxide absorbed therein, with a non-resinous liquid capable of undergoing a condensation reaction in the presence of condensing agents to form a water-eliminating solid resin, and maintaining the impregnated wood at a reaction temperature until a resin is formed therein.

2. A method of resinifying wood which comprises impregnating the wood with sulfur dioxide, removing the sulfur dioxide, in excess of that absorbed by the wood, from contact with the latter, impregnating the wood, having sulfur dioxide absorbed therein, with a non-resinous liquid which is capable of undergoing a water-eliminating condensation reaction under the action of heat and sulfur dioxide as a condensing agent to form a solid resin, removing unabsorbed liquid from contact with the impregnated wood, and heating the latter to form a resin therein.

3. A method, as claimed in claim 2, wherein wood impregnated with sulfur dioxide and the non-resinous, resin-forming liquid is heated in contact with a substantially inert gas at superatmospheric pressure to cause formation of a resin within the wood.

4. A method, as claimed in claim 2, wherein the non-resinous, resin-forming liquid is one containing a major proportion by weight of furfuryl alcohol.

5. A method, as claimed in claim 2, wherein the non-resinous, resin-forming liquid is a solution of phenol and formaldehyde.

6. A method, as claimed in claim 2, wherein the non-resinous, resin-forming liquid is a solution of phenol and furfural.

7. A method, as claimed in claim 2, wherein the non-resinous, resin-forming liquid is a solution of urea and formaldehyde.

8. A method of resinifying wood which comprises evacuating air from the wood, then contacting and impregnating the wood with sulfur dioxide at a pressure at least as high as atmospheric pressure, displacing unabsorbed sulfur dioxide from the wood with air, immersing the sulfur dioxide-impregnated wood in a non-resinous liquid which is capable of undergoing a water-eliminating condensation reaction under the action of heat and sulfur dioxide as a condensing agent to form a solid resin, impregnating the wood with the non-resinous, resin-forming liquid at superatmospheric pressure, removing unabsorbed liquid from contact with the impregnated wood, and heating the latter at reaction temperatures between 50° and 150° C. in contact with a substantially non-reactive gas at superatmospheric pressure to form a resin within the wood.

9. A method, as claimed in claim 8, wherein the non-resinous, resin-forming liquid is one containing a major proportion by weight of furfuryl alcohol.

10. A method, as claimed in claim 8, wherein the non-resinous, resin-forming liquid is a solution of phenol and formaldehyde.

11. A method, as claimed in claim 8, wherein the non-resinous, resin-forming liquid is a solution of phenol and furfural.

12. A method, as claimed in claim 8, wherein the non-resinous, resin-forming liquid is a solution of urea and formaldehyde.

13. A method, as claimed in claim 8, wherein the non-resinous, resin-forming liquid comprises, as its essential ingredients, a mixture of phenol with more than its molecular equivalent of furfuryl alcohol.

14. A method, as claimed in claim 2, wherein the non-resinous, resin-forming liquid comprises, as its essential ingredients, a mixture of phenol with more than its molecular equivalent of furfuryl alcohol.

References Cited in the file of this patent
UNITED STATES PATENTS

| | | |
|---|---|---|
| 1,995,499 | Derby | Mar. 26, 1935 |
| 2,313,953 | Loughborough | Mar. 16, 1943 |
| 2,536,107 | Sugarman et al. | Jan. 2, 1951 |
| 2,740,728 | Sonnabend et al. | Apr. 3, 1956 |
| 2,776,266 | Harvey | Jan. 1, 1957 |

UNITED STATES PATENT OFFICE

CERTIFICATION OF CORRECTION

Patent No. 2,947,648                                August 2, 1960

Lawrence F. Sonnabend et al.

It is hereby certified that error appears in the above numbered patent requiring correction and that the said Letters Patent should read as corrected below.

Column 3, lines 28 and 36, for "sulful", each occurrence, read -- sulfur --; column 7, lines 5 and 6, strike out "water-eliminating" and insert the same after "a" in line 4, same column.

Signed and sealed this 9th day of May 1961.

(SEAL)
Attest:

ERNEST W. SWIDER                                          DAVID L. LADD

Attesting Officer                                             Commissioner of Patents